United States Patent
Tochigi et al.

(10) Patent No.: US 10,712,220 B2
(45) Date of Patent: Jul. 14, 2020

(54) PRESSURE SENSOR

(71) Applicant: Azbil Corporation, Chiyoda-ku (JP)

(72) Inventors: Hidenobu Tochigi, Chiyoda-ku (JP); Takuya Ishihara, Chiyoda-ku (JP)

(73) Assignee: Azbil Corporation, Chiyoda-ku (JP)

( * ) Notice: Subject to any disclaimer, the term of this patent is extended or adjusted under 35 U.S.C. 154(b) by 218 days.

(21) Appl. No.: 16/064,229

(22) PCT Filed: Nov. 7, 2016

(86) PCT No.: PCT/JP2016/082926
§ 371 (c)(1),
(2) Date: Jun. 20, 2018

(87) PCT Pub. No.: WO2017/110270
PCT Pub. Date: Jun. 29, 2017

(65) Prior Publication Data
US 2019/0025146 A1 Jan. 24, 2019

(30) Foreign Application Priority Data
Dec. 21, 2015 (JP) .................................. 2015-248582

(51) Int. Cl.
*G01L 9/12* (2006.01)
*G01L 27/00* (2006.01)
(Continued)

(52) U.S. Cl.
CPC ............... *G01L 9/12* (2013.01); *G01L 27/002* (2013.01); *G01L 27/02* (2013.01); *G01D 18/00* (2013.01);
(Continued)

(58) Field of Classification Search
CPC ......... G01L 9/12; G01L 9/007; G01L 9/0072; G01L 9/0075; G01L 27/002; G01L 27/02;
(Continued)

(56) References Cited

U.S. PATENT DOCUMENTS 9,000,833 B2 * 4/2015 Caffee .................... H02N 1/006
327/516
2007/0068266 A1 3/2007 Fujimori et al.
(Continued)

FOREIGN PATENT DOCUMENTS

JP 2005-337924 A 12/2005
JP 2007-86002 A 4/2007
(Continued)

OTHER PUBLICATIONS

International Search Report dated Dec. 20, 2016, in PCT/JP2016/082926 filed Nov. 7, 2016.

*Primary Examiner* — Jonathan M Dunlap
(74) *Attorney, Agent, or Firm* — Oblon, McClelland, Maier & Neustadt, L.L.P.

(57) ABSTRACT

Aiming to more easily perform calibration of a sensor output from a pressure sensor, the calibration being necessitated due to the occurrence of sedimentation, a resonance point measurement unit (122) measures a resonance point of a diaphragm (112) on the basis of the result obtained by performing measurement of a constant pressure using the pressure sensor while a power supply frequency is changed, a characteristic calculation unit (123) calculates, on the basis of the measured resonance point, an elastic modulus of the diaphragm (112) at the time of the measurement of the resonance point, and a correction unit (124) calculates a corrected sensor sensitivity resulting from correcting a sensor sensitivity of a sensor chip (101) on the basis of the elastic modulus calculated by the characteristic calculation unit (123).

4 Claims, 2 Drawing Sheets

(51) Int. Cl.
*G01L 27/02* (2006.01)
*G01L 1/14* (2006.01)
*G01L 9/00* (2006.01)
*G01L 25/00* (2006.01)
*G01D 18/00* (2006.01)

(52) U.S. Cl.
CPC ............... *G01D 18/008* (2013.01); *G01L 1/14* (2013.01); *G01L 1/142* (2013.01); *G01L 1/148* (2013.01); *G01L 9/0072* (2013.01); *G01L 9/0073* (2013.01); *G01L 9/0075* (2013.01); *G01L 25/00* (2013.01); *G01L 27/007* (2013.01)

(58) Field of Classification Search
CPC ......... G01L 27/007; G01L 1/14; G01L 1/148; G01L 1/142; G01L 25/00; G01D 18/00; G01D 18/008
See application file for complete search history.

(56) References Cited

U.S. PATENT DOCUMENTS

| | | | | |
|---|---|---|---|---|
| 2014/0253219 | A1* | 9/2014 | Caffee | H02N 1/006 327/516 |
| 2014/0306623 | A1* | 10/2014 | Caffee | H02N 1/006 318/116 |

FOREIGN PATENT DOCUMENTS

| | | |
|---|---|---|
| JP | 2013-124947 A | 8/2013 |
| JP | 2014-109484 A | 6/2014 |

* cited by examiner

PRESSURE SENSOR

TECHNICAL FIELD

The present invention relates to a pressure sensor for measuring a pressure by a capacitive pressure sensor including a movable portion such as a diaphragm.

BACKGROUND ART

Various film forming apparatuses utilizing vapor deposition are used in manufacturing of semiconductor devices. In those film forming apparatuses, the pressure inside a film forming chamber, the partial pressures of material gases, etc. are accurately controlled to form thin films having thicknesses in units of nm. Accurately detecting those pressures is important in performing the accurate control. A capacitive pressure sensor is used for the purpose of such pressure detection (see Patent Literature (PTL) 1).

That type of pressure sensor includes, as illustrated in FIG. 3, a base 301 made of an insulator. The pressure sensor further includes a diaphragm 302 receiving pressure from a measurement target. The diaphragm 302 is made of an insulator and is supported over the base 301 by a support portion 301a. The diaphragm 302 is arranged in a movable region 302a in a spaced relation to the base 301. In addition, the diaphragm 302 is displaceable in the movable region 302a in a direction facing the base 301. The pressure sensor further includes an airtight chamber 303 formed between the diaphragm 302 in the movable region 302a and the base 301.

The pressure sensor further includes a movable electrode 304 formed in the movable region 302a of the diaphragm 302 inside the airtight chamber 303. The pressure sensor further includes a fixed electrode 305 formed on the base 301 inside the airtight chamber 303 in an opposing relation to the movable electrode 304. The pressure sensor further includes a movable reference electrode 306 formed in the movable region 302a of the diaphragm 302 around the movable electrode 304 inside the airtight chamber 303. The pressure sensor further includes a fixed reference electrode 307. The fixed reference electrode 307 is formed on the base 301 around the fixed electrode 305 inside the airtight chamber 303. The fixed reference electrode 307 is formed in an opposing relation to the movable reference electrode 306.

The pressure sensor having the above-described structure is mounted to a pipe through which a fluid as a measurement target flows or a tank in which a fluid to be measured is stored, thus measuring a pressure of the fluid. In the capacitive pressure sensor, a displacement of the movable region 302a of the diaphragm 302 having received the fluid pressure is converted to a capacitance value between the movable electrode 304 and the fixed electrode 305. That type of pressure sensor is widely used in industrial applications, including the above-mentioned equipment for use in manufacturing the semiconductor devices, because it is less dependent on the kinds of gas.

CITATION LIST

Patent Literature

PTL 1: Japanese Unexamined Patent Application Publication No. 2014-109484

SUMMARY OF INVENTION

Technical Problem

The above-described pressure sensor is required to have not only corrosion resistance against gases used in the apparatus, such as material gases, but also resistance against byproducts generated in a film forming process, etc. Furthermore, in the film forming process, sedimentation occurs at locations where the material gases pass, such as an inner wall of the film forming chamber, inner walls of pipes, the interior of a vacuum pump, and the diaphragm serving as a pressure receiving portion of the pressure sensor. The occurrence of sedimentation causes various problems.

For instance, an Atomic Layer Deposition (ALD) has been recently developed and used in forming a gate insulating film, etc. for the reason that the ALD is superior in step coverage and film quality to a CVD (Chemical Vapor Deposition) generally used so far. In the ALD, for specific properties, the material gases are more likely to adhere to the various locations where the material gases pass, and the above-mentioned undesired sedimentation is more apt to occur.

In the above-described film forming apparatus, aiming to prevent the occurrence of sedimentation, individual portions are heated to about 200° C., for example, in the film forming operation, etc. However, the sedimentation is progressed little by little in spite of carrying out the countermeasure based on the heating. In the pressure sensor, as illustrated in FIG. 3, a sediment 321 is built up in a pressure receiving region of the diaphragm 302.

When the sedimentation occurs, a sensor sensitivity of the pressure sensor is changed depending on an amount of the sediment. Therefore, the pressure sensor in which the sedimentation has occurred needs to be calibrated depending on the changed sensor sensitivity. Such calibration is performed by demounting the pressure sensor from the apparatus. Thus, the operation of the apparatus is stopped for a long time, and a lot of time and effort are required for the calibration.

The present invention has been made with intent to solve the above-described problem, and an object of the present invention is to enable calibration of a sensor output from a pressure sensor to be more easily performed, the calibration being necessitated due to the occurrence of sedimentation.

Solution to Problem

The present invention provides a pressure sensor in which a pressure receiving portion receives pressure from a measurement target and the pressure is measured on the basis of a capacitance change caused by a displacement of the pressure receiving portion, the pressure sensor including a pressure value output unit converting the capacitance change to a pressure value in accordance with a set sensor sensitivity, and outputting the pressure value, a resonance point measurement unit measuring a resonance point of the pressure receiving portion on the basis of the result obtained by performing measurement of a constant pressure using the pressure sensor while a power supply frequency is changed, a characteristic calculation unit calculating, on the basis of the resonance point measured by the resonance point measurement unit, a thickness or an elastic modulus of the pressure receiving portion as a physical characteristic of the pressure receiving portion, and a correction unit calculating a corrected sensor sensitivity resulting from correcting a sensor sensitivity of the pressure sensor on the basis of the physical characteristic calculated by the characteristic calculation unit, and updating the sensor sensitivity set in the pressure value output unit with the corrected sensor sensitivity having been calculated.

In the above-described pressure sensor, the characteristic calculation unit may calculate the elastic modulus of the pressure receiving portion as the physical characteristic.

The above-described pressure sensor may further include a detection unit detecting that a difference between a reference value and the resonance point measured by the resonance point measurement unit has exceeded a specified value, the reference value being given as the resonance point at the time of calculating the corrected sensitivity in previous correction, and upon the detection unit detecting that the difference between the measured resonance point and the reference value has exceeded the specified value, the characteristic calculation unit may calculate the physical characteristic, and the correction unit may calculate the corrected sensor sensitivity and may update the sensor sensitivity set in the pressure value output unit with the corrected sensor sensitivity having been calculated.

The above-described pressure sensor may further include an alarm output unit detecting that the corrected sensor sensitivity calculated by the correction unit has exceeded a set allowable range, and outputting an alarm.

Advantageous Effects of Invention

With the above-described features, the present invention can provide a valuable advantageous effect that calibration of a sensor output from the pressure sensor can be more easily performed, the calibration being necessitated due to the occurrence of sedimentation.

DESCRIPTION OF EMBODIMENTS

Figure 1:
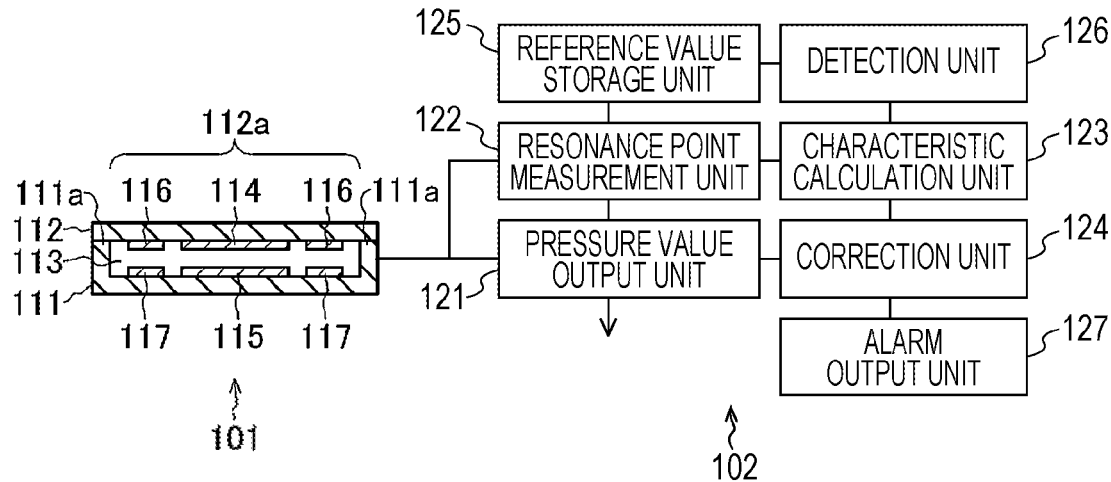
FIG. 1 is a block diagram illustrating a configuration of a pressure sensor according to an embodiment of the present invention.

An embodiment of the present invention will be described below with reference to the drawings. FIG. 1 is a block diagram illustrating a configuration of a pressure sensor according to the embodiment of the present invention. The pressure sensor includes a sensor chip 101 and a circuit section 102.

The sensor chip 101 is of the well-known capacitance type, and it includes a base 111, a diaphragm 112, a movable electrode 114, and a fixed electrode 115. The base 111 and the diaphragm 112 are each made of an insulator having heat resistance and corrosion resistance, such as sapphire or alumina ceramic. The diaphragm 112 serving as a pressure receiving portion is supported by a support portion 111a of the base 111. The diaphragm 112 is a movable portion that is displaceable in a direction facing the base 111 in a movable region 112a at the inner side of the support portion 111a. The movable region 112a has, for example, a circular shape when viewed in plan.

An airtight chamber 113 having an air-tightly sealed space is formed between the diaphragm 112 in the movable region 112a and the base 111. When the pressure sensor is used as a vacuum gauge, the airtight chamber 113 is held in the so-called vacuum state, and it functions as a reference vacuum chamber.

The movable electrode 114 is formed in the movable region 112a of the diaphragm 112 inside the airtight chamber 113. The fixed electrode 115 is formed on the base 111 in an opposing relation to the movable electrode 114 inside the airtight chamber 113. The sensor chip 101 according to this embodiment further includes a movable reference electrode 116 formed around the movable electrode 114 in the movable region 112a of the diaphragm 112 inside the airtight chamber 113. The sensor chip 101 according to this embodiment still further includes a fixed reference electrode 117 formed on the base 111 around the fixed electrode 115 in an opposing relation to the movable reference electrode 116 inside the airtight chamber 113.

The circuit section 102 includes a pressure value output unit 121, a resonance point measurement unit 122, a characteristic calculation unit 123, and a correction unit 124.

The pressure value output unit 121 converts a capacitance change to a pressure value in accordance with the set sensor sensitivity, and outputs the pressure value. The sensor sensitivity of the sensor chip 101, which has been initially measured, is set in the pressure value output unit 121. The circuit section 102 is electrically connected to the individual electrodes inside the airtight chamber 113 via wirings (not illustrated) formed in the base 111 and through-wirings penetrating the base 111. Capacitances formed by the individual electrodes and changes of the capacitances are read by the pressure value output unit 121 via the above-mentioned wirings and through-wirings.

The resonance point measurement unit 122 measures a resonance point of the diaphragm 112 that is the pressure receiving portion. The resonance point measurement unit 122 measures the resonance point on the basis of the result obtained by performing measurement of a constant pressure using the pressure sensor while a power supply frequency is changed. The measurement of the constant pressure while the power supply frequency is changed is performed by changing the frequency of a power supply (called the "power supply frequency"), which is applied between the movable electrode 114 and the fixed electrode 115 to detect a capacitance value.

In an example, the frequency of a power supply voltage in a state that the diaphragm 112 does not receive pressure (i.e., that it is not flexed), namely in a state measuring the so-called 0 point, is gradually changed in units of, e.g., several Hz from a low frequency toward a high frequency. Through a process in which a vibration state of the diaphragm 112 is varied by changing the frequency of the power supply voltage as described above, the resonance point of the diaphragm 112 is measured from a change of the sensor output value of the sensor chip 101. The power supply frequency at the time when the change of the sensor output value caused depending on the above-mentioned change of the power supply frequency exceeds a predetermined threshold is defined as the resonance point of the diaphragm 112.

The characteristic calculation unit 123 calculates, as a physical characteristic of the pressure receiving portion, a thickness or an elastic modulus of the pressure receiving portion on the basis of the resonance point measured by the resonance point measurement unit 122. In an example, the characteristic calculation unit 123 calculates, as the physical characteristic of the pressure receiving portion, the elastic modulus of the diaphragm 112 that is the pressure receiving portion.

A resonance point $f_n$ measured by the resonance point measurement unit 122 can be expressed as "$f_n = \alpha t E^{1/2}$ . . . (1)" using a correction coefficient $\alpha$ that is a constant, a thickness t of the diaphragm 112, and an elastic modulus E of the diaphragm 112. When the sediment is built up on a pressure receiving surface of the diaphragm 112, the elastic modulus is changed. A thickness of the sediment is as thin as negligible with respect to the thickness of the diaphragm 112. Therefore, even when the sediment is built up, t in the formula (1) can be approximated as the thickness of the diaphragm 112. Thus, the elastic module E' in the state of the sediment being built up can be determined as "$E'=(f_n/\alpha/t)^2 \ldots (2)$" using the measured resonance point $f_n$.

The correction unit 124 calculates a corrected sensor sensitivity resulting from correcting the sensor sensitivity of the pressure sensor (sensor chip 101) on the basis of the physical characteristic calculated by the characteristic calculation unit 123. The correction unit 124 further updates the sensor sensitivity set in the pressure value output unit 121 with the corrected sensor sensitivity having been calculated. A sensor sensitivity S can be expressed as "$S=\beta-1/Et^3 \ldots (3)$" using a correction coefficient $\beta$ that is a constant. A corrected sensor sensitivity S' can be expressed as "$S'=\beta-1/E't^3 \ldots (4)$" in which E in the formula (3) is updated with the elastic modulus E' that has been calculated by the characteristic calculation unit 123 as described above. Here, the sensor sensitivity S is defined as "$S=C_p-C_0 \ldots (5)$" using a sensor output value (capacitance value) $C_p$ in the state in which pressure is applied to the diaphragm 112, and a sensor output value $C_0$ in the state in which no pressure is applied to the diaphragm 112.

When a relation between a change of the applied pressure and a change of the capacitance is non-linear, $\beta$ may be set as a function of pressure in the formula (4). A manner of deriving the corrected sensor sensitivity may be set as appropriate in conformity with the characteristics of the sensor chip 101 to be used and measurement environments.

According to the embodiment, as described above, the calibration of the pressure sensor, which is necessitated due to the buildup of the sediment on the pressure receiving surface of the diaphragm 112, can be promptly performed without demounting the sensor chip 101 from an apparatus.

The circuit section 102 further includes a reference value storage unit 125, a detection unit 126, and an alarm output unit 127.

The detection unit 126 detects whether the difference between a reference value and the resonance point measured by the resonance point measurement unit 122 has exceeded a specified value. The reference value is given as the resonance point at the time of calculating the corrected sensitivity by the correction unit 124 in the previous correction. The reference value is stored in the reference value storage unit 125.

When the detection unit 126 detects that the difference between the measured resonance point and the reference value has exceeded the specified value, the characteristic calculation unit 123 calculates the physical characteristic. The correction unit 124 calculates the corrected sensor sensitivity on the basis of the physical characteristic calculated by the characteristic calculation unit 123. Furthermore, the correction unit 124 updates the sensor sensitivity set in the pressure value output unit 121 with the corrected sensor sensitivity having been calculated.

If the amount of the sediment built up on the pressure receiving surface of the diaphragm 112 is minute, a change of the sensor sensitivity is small, and there is no need of the calibration. Similarly, if an increment of the sediment amount is minute, a change of the sensor sensitivity from that obtained at the time of performing the previous correction (calibration process) is small, and there is no need of new calibration. On the other hand, if the change of the sensor sensitivity corresponding to the increment of the sediment amount reaches a level affecting the measurement, the calibration is needed.

In the pressure sensor according to the embodiment, the increment of the sediment amount at which the calibration is needed is detected by the detection unit 126 on the basis of the change of the resonance point. To that end, the above-mentioned specified value requires to be set such that a state in which the difference between the measured resonance point and the reference value exceeds the specified value corresponds to the above-mentioned increase of the sediment amount at which the calibration is needed. As a result, a calibration operation is performed automatically.

Here, the reference value may be stored into the reference value storage unit 125, for example, at the time of calculating and updating the corrected sensor sensitivity by the correction unit 124. Thus, the resonance point used at that time to calculate the corrected sensor sensitivity is stored as the reference value into the reference value storage unit 125.

In an example, the reference value storage unit 125 may be designed into such setting that it stores only one reference value. When the reference value is already stored in the reference value storage unit 125, the reference value storage unit 125 rewrites the already-stored reference value with the reference value stored at the time of calculating and updating the corrected sensor sensitivity by the correction unit 124, and comes into a state in which the latter reference value is stored as the new resonance point. As a result, the resonance point used by the correction unit 124 to calculate the corrected sensor sensitivity in the previous correction is stored in the reference value storage unit 125. It is to be noted that the resonance point of the diaphragm 112 in the sensor chip 101 immediately after being manufactured may be set as an initial value.

Thus, when the difference between the resonance point measured at the present time and the reference value stored in the reference value storage unit 125 exceeds the specified value, and eventually when the sediment amount newly incremented at that time reaches the level affecting the measurement, it is determined that the current state needs the calibration.

The alarm output unit 127 detects that the corrected sensor sensitivity calculated by the correction unit 124 has exceeded a set allowable range, and outputs an alarm. If the sensor sensitivity used in the pressure value output unit 121 becomes too small, a dynamic range of the output pressure value would be reduced, and the desired measurement resolution could not be obtained. In consideration of the above point, upon detecting that the corrected sensor sensitivity calculated by the correction unit 124 has exceeded the set allowable range, the alarm is issued to prompt replacement of the sensor chip 101.

Figure 2:
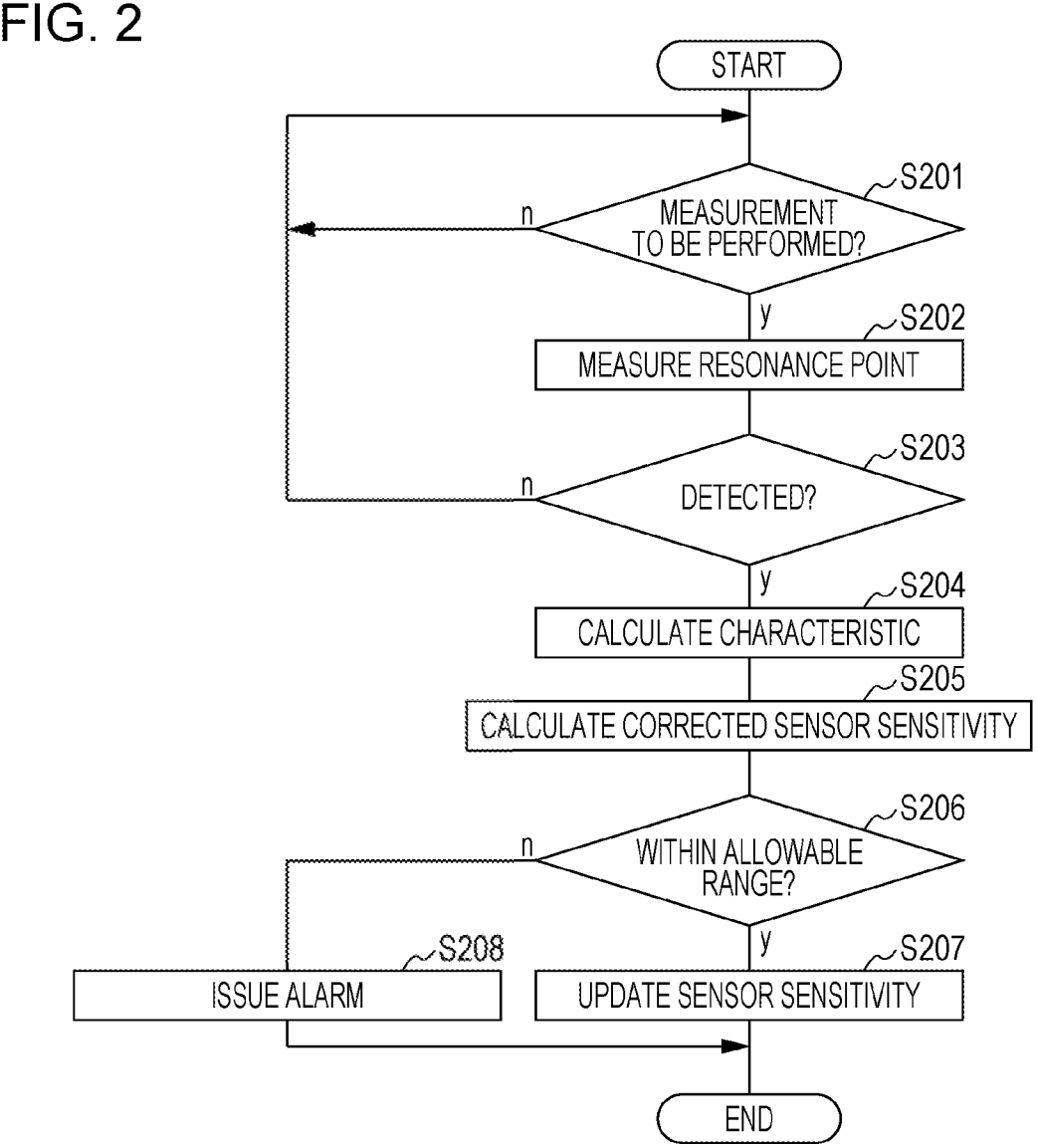
FIG. 2 is a flowchart referenced to explain an example of operation of the pressure sensor according to the embodiment of the present invention.
Figure 3:
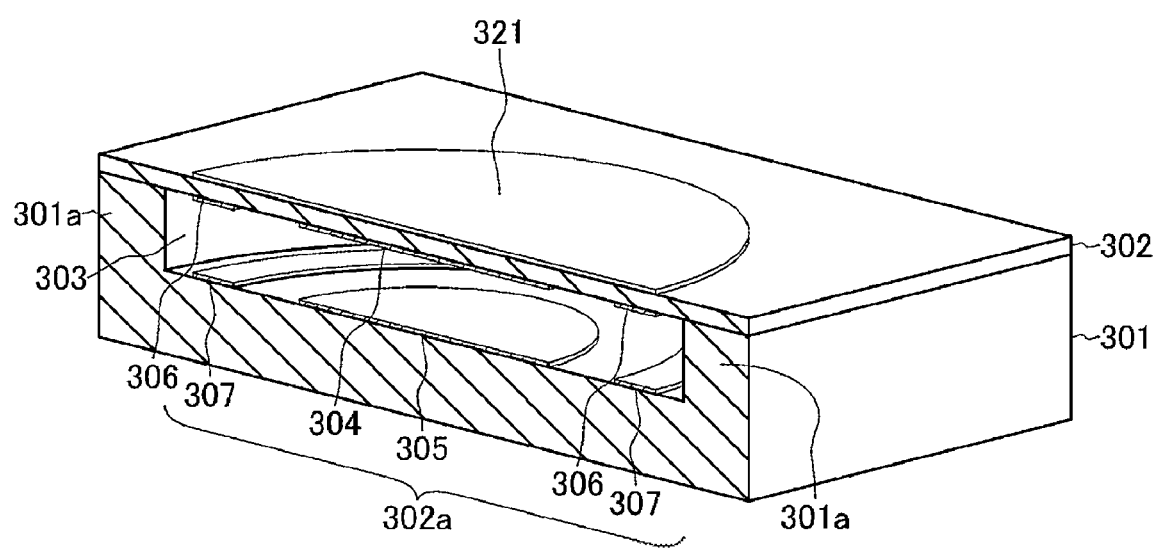
FIG. 3 is a perspective view illustrating a partial structure of the pressure sensor in a partly cut-away state.

An example of operation of the pressure sensor according to the embodiment of the present invention will be described below with reference to a flowchart of FIG. 2.

First, upon reaching the time of performing the measurement of the resonance point in step S201 ("y" in step S201), an operation process shifts to step S202 in which the resonance point measurement unit 122 measures the resonance point of the diaphragm 112 on the basis of the result obtained by performing the measurement of the constant pressure using the pressure sensor while the power supply frequency is changed. In an example, the measurement of the resonance point is performed with the lapse of each preset time. As an alternative, the measurement of the resonance point is performed in accordance with an instruction of performing the measurement, the instruction being entered from an input unit not illustrated.

Next, in step S203, the detection unit 126 detects whether the difference between the reference value stored in the reference value storage unit 125 and the resonance point measured by the resonance point measurement unit 122 has exceeded the specified value. If it is detected that the difference between the reference value and the resonance point has exceeded the specified value ("y" in step S203), the characteristic calculation unit 123 calculates, in step S204, the elastic modulus E' of the diaphragm 112 at the time of the measurement of the resonance point using the formula (2) from the measured resonance point $f_n$, the correction coefficient α, and the thickness t of the diaphragm 112.

Next, in step S205, the correction unit 124 calculates the corrected sensor sensitivity S' resulting from correcting the sensor sensitivity of the sensor chip 101 on the basis of the elastic modulus E', which is the physical characteristic calculated by the characteristic calculation unit 123, using the formula (4).

Next, in step S206, the alarm output unit 127 detects whether the corrected sensor sensitivity S' calculated by the correction unit 124 has exceeded the set allowable range. If the corrected sensor sensitivity S' does not exceed the allowable range and is within the allowable range ("y" in step S206), the correction unit 124 updates, in step S207, the sensor sensitivity set in the pressure value output unit 121 with the corrected sensor sensitivity S' having been calculated. On the other hand, if it is detected that the corrected sensor sensitivity S' exceeds the allowable range ("n" in step S206), the alarm output unit 127 issues (outputs) the alarm.

Thus, if the difference between the reference value and the measured resonance point exceeds the specified value and the corrected sensor sensitivity having been calculated is within the allowable range, the sensor sensitivity set in the pressure value output unit 121 is updated with the corrected sensor sensitivity. Such calibration operation can be performed without substantially stopping the operation of an apparatus in which the pressure sensor is used, because the calibration is performed in the state in which the sensor chip 101 is mounted to the apparatus.

According to the present invention, as described above, the resonance point of the pressure receiving portion is first measured on the basis of the result obtained by performing the measurement of the constant pressure while the power supply frequency is changed. Then, the corrected sensor sensitivity resulting from correcting the sensor sensitivity of the pressure sensor is calculated on the basis of the physical characteristic of the pressure receiving portion, which can be calculated on the basis of the measured resonance point. As a result, the calibration of the sensor output, which is necessitated due to the occurrence of sedimentation, can be more easily performed according to the present invention.

It is apparent that the present invention is not limited to the above-described embodiment, and that a variety of modifications and combinations can be put into practice by those having the ordinary knowledge in the relevant art without departing from the technical concept of the present invention. For instance, while the elastic modulus is determined as the physical characteristic of the pressure receiving portion in the above description, the present invention is not limited to that case, and the thickness of the pressure receiving portion may be determined as the physical characteristic like the elastic modulus. Thus, a method of determining the elastic modulus may be selected as appropriate in consideration of characteristics of the pressure receiving portion, problematic conditions caused by buildup of the sediment, etc.

REFERENCE SIGNS LIST

101 . . . sensor chip, 102 . . . circuit section, 111 . . . base, 111a . . . support portion, 112 . . . diaphragm, 112a . . . movable region, 113 . . . airtight chamber, 114 . . . movable electrode, 115 . . . fixed electrode, 116 . . . movable reference electrode, 117 . . . fixed reference electrode, 121 . . . pressure value output unit, 122 . . . resonance point measurement unit, 123 . . . characteristic calculation unit, 124 . . . correction unit, 125 . . . reference value storage unit, 126 . . . detection unit, 127 . . . alarm output unit.

The invention claimed is:

1. A pressure sensor in which a pressure receiving portion receives pressure from a measurement target and the pressure is measured on the basis of a capacitance change caused by a displacement of the pressure receiving portion, the pressure sensor comprising:
    a pressure value output unit converting the capacitance change to a pressure value in accordance with a set sensor sensitivity, and outputting the pressure value;
    a resonance point measurement unit measuring a resonance point of the pressure receiving portion on the basis of result obtained by performing measurement of a constant pressure using the pressure sensor while a power supply frequency is changed;
    a characteristic calculation unit calculating, on the basis of the resonance point measured by the resonance point measurement unit, a thickness or an elastic modulus of the pressure receiving portion as a physical characteristic of the pressure receiving portion; and
    a correction unit calculating a corrected sensor sensitivity resulting from correcting a sensor sensitivity of the pressure sensor on the basis of the physical characteristic calculated by the characteristic calculation unit, and updating the sensor sensitivity set in the pressure value output unit with the corrected sensor sensitivity having been calculated.

2. The pressure sensor according to claim 1, wherein the characteristic calculation unit calculates the elastic modulus of the pressure receiving portion as the physical characteristic.

3. The pressure sensor according to claim 1, further comprising a detection unit detecting that a difference between a reference value and the resonance point measured by the resonance point measurement unit has exceeded a specified value, the reference value being given as the resonance point at the time of calculating the corrected sensitivity in previous correction,
    wherein, upon the detection unit detecting that the difference between the pleasured resonance point and the reference value has exceeded the specified value, the characteristic calculation unit calculates the physical characteristic, and the correction unit calculates the corrected sensor sensitivity and updates the sensor sensitivity set in the pressure value output unit with the corrected sensor sensitivity having been calculated.

4. The pressure sensor according to claim 1, further comprising an alarm output unit detecting that the corrected sensor sensitivity calculated by the correction unit has exceeded a set allowable range, and outputting an alarm.

* * * * *